(12) United States Patent
Xie et al.

(10) Patent No.: US 9,621,877 B2
(45) Date of Patent: Apr. 11, 2017

(54) RGB-D IMAGING SYSTEM AND METHOD USING ULTRASONIC DEPTH SENSING

(71) Applicant: SZ DJI TECHNOLOGY CO., LTD., Shenzhen, Guangdong (CN)

(72) Inventors: Jiebin Xie, Guangdong (CN); Wei Ren, Guangdong (CN); Guyue Zhou, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/973,001

(22) Filed: Dec. 17, 2015

(65) Prior Publication Data
US 2016/0134858 A1    May 12, 2016

Related U.S. Application Data

(63) Continuation of application No. PCT/CN2014/089741, filed on Oct. 28, 2014.

(51) Int. Cl.
*H04N 13/02* (2006.01)
*G01S 15/02* (2006.01)
(Continued)

(52) U.S. Cl.
CPC ......... *H04N 13/0257* (2013.01); *G01S 7/521* (2013.01); *G01S 15/025* (2013.01);
(Continued)

(58) Field of Classification Search
CPC .. H04N 13/0257; H04N 13/025; G01S 7/521; G01S 15/87; G01S 15/89; G01S 15/025
See application file for complete search history.

(56) References Cited

U.S. PATENT DOCUMENTS

| 8,259,161 B1* | 9/2012 | Huang | H04N 13/0221 348/50 |
| 2005/0285962 A1* | 12/2005 | Cornejo | G01S 15/08 348/333.01 |

(Continued)

FOREIGN PATENT DOCUMENTS

| CN | 103460256 A | 12/2013 |
| CN | 103971409 A | 8/2014 |

(Continued)

OTHER PUBLICATIONS

WO, International Search Report and Written Opinion, PCT/US2014/089741, Aug. 5, 2016.
(Continued)

*Primary Examiner* — Hung Lam
(74) *Attorney, Agent, or Firm* — Anova Law Group, PLLC

(57) ABSTRACT

An RGB-D imaging system having an ultrasonic array for generating images that include depth data, and methods for manufacturing and using same. The RGB-D imaging system includes an ultrasonic sensor array positioned on a housing that includes an ultrasonic emitter and a plurality of ultrasonic sensors. The RGB-D imaging system also includes an RGB camera assembly positioned on the housing in a parallel plane with, and operably connected to, the ultrasonic sensor. The RGB-D imaging system thereby provides/enables improved imaging in a wide variety of lighting conditions compared to conventional systems.

28 Claims, 9 Drawing Sheets

(51) Int. Cl.
*G01S 7/521* (2006.01)
*G01S 15/87* (2006.01)
*G01S 15/89* (2006.01)

(52) U.S. Cl.
CPC .............. *G01S 15/87* (2013.01); *G01S 15/89* (2013.01); *H04N 13/025* (2013.01)

(56) References Cited

U.S. PATENT DOCUMENTS

| | | | |
|---|---|---|---|
| 2007/0083116 A1* | 4/2007 | Sato | A61B 8/06 600/437 |
| 2007/0195646 A1 | 8/2007 | Govindswamy et al. | |
| 2010/0272286 A1 | 10/2010 | Bai et al. | |
| 2012/0224067 A1* | 9/2012 | Stuart | G06F 17/30265 348/164 |
| 2013/0100774 A1* | 4/2013 | Brown | G01S 15/931 367/99 |
| 2014/0009561 A1 | 1/2014 | Sutherland et al. | |
| 2014/0028799 A1* | 1/2014 | Kuffner | G01B 11/24 348/46 |
| 2014/0092221 A1* | 4/2014 | Nagai | H04N 13/0022 348/51 |
| 2014/0354874 A1* | 12/2014 | Lee | H04N 5/23222 348/348 |
| 2015/0341540 A1* | 11/2015 | Kim | H04N 5/23203 348/144 |
| 2015/0381965 A1* | 12/2015 | Atanassov | G06T 7/0051 348/47 |

FOREIGN PATENT DOCUMENTS

| | | |
|---|---|---|
| TW | 443156 U | 12/2012 |
| WO | WO 2014/001955 A1 | 7/2014 |

OTHER PUBLICATIONS

EP, Euopean Extended Search Report, Application No. 14904905.8, Sep. 22, 2016.

\* cited by examiner

RGB-D IMAGING SYSTEM AND METHOD USING ULTRASONIC DEPTH SENSING

CROSS-REFERENCE TO RELATED APPLICATIONS

This application is a continuation of, and claims priority to, copending PCT Patent Application Number PCT/CN2014/089741, which was filed on Oct. 28, 2014. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to digital imaging, computer vision and ultrasonic sensing, and more specifically to RGB-D camera systems and methods.

BACKGROUND

An RGB-D camera is a camera capable of generating three-dimensional images (a two-dimensional image in a plane plus a vertical depth diagram image). An RGB-D camera conventionally has two different groups of sensors. One of the groups comprises optical receiving sensors (such as RGB cameras), which are used for receiving ambient images that are conventionally represented with respective strength values of three colors: R (red), G (green) and B (blue). The other group of sensors comprises infrared lasers or structured light sensors, for detecting a distance (D) of an object being observed and for acquiring a depth diagram image. Applications of RGB-D cameras include spatial imaging, gesture identifications, distance detection, and the like.

One type of RGB-D camera applies an infrared light source for imaging (e.g., the Microsoft Kinect). Such a camera has a light source that can emit infrared light with specific spatial structures. Additionally, such a camera is equipped with a lens and a filter chip for receiving the infrared light. An internal processor of the camera calculates the structures of the received infrared light, and through variations of the light structures, the processor perceives the structure and distance information of the object.

Conventional RGB-D cameras, such as the Microsoft Kinect, utilize an infrared light detection approach for acquiring depth information. However, the approach based on infrared light detection works poorly in outdoor settings, especially for objects illuminated by sunlight because the sunlight spectrum has a strong infrared signature that can conceal the infrared light emitted from a detector. Some infrared light detectors attempt to solve this issue by increasing their power, (e.g. with laser or by increasing the strength of the light source). However, this approach is undesirable because it requires greater power consumption.

In view of the foregoing, a need exists for an improved RGB-D imaging system and method to overcome the aforementioned obstacles and deficiencies of conventional RGB-D imaging systems.

Figure 1:
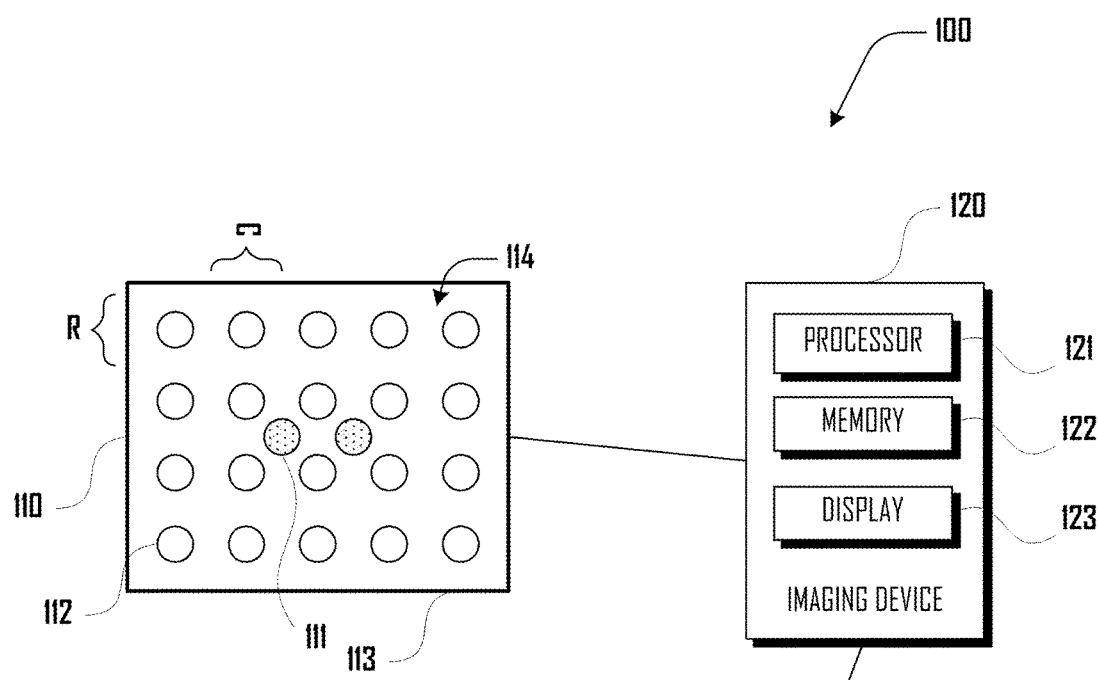
FIG. 1 is an exemplary top-level drawing illustrating an embodiment of an RGB-D imaging system.
Figure 1:
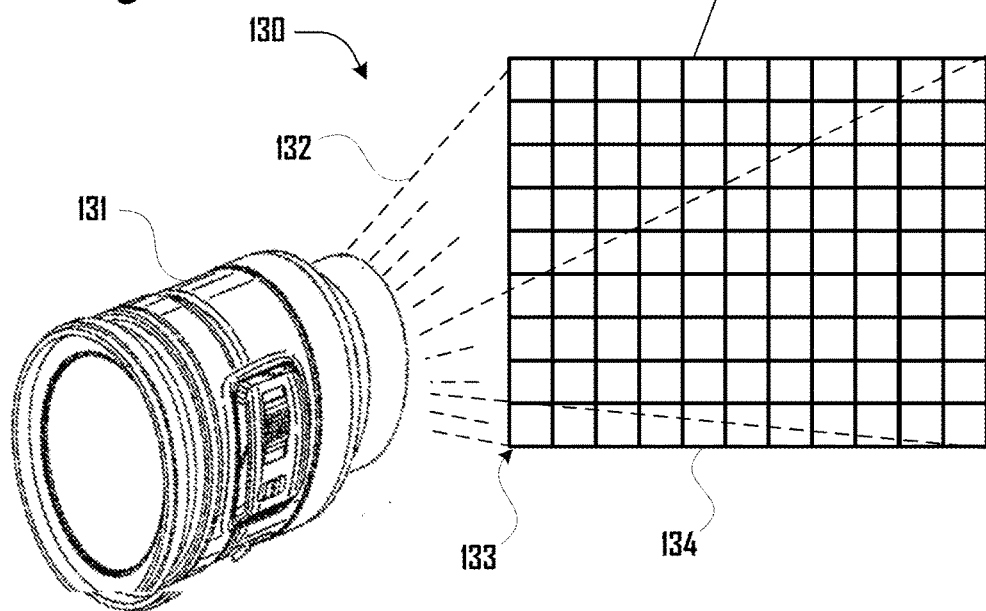

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available RGB-D imaging systems are deficient because they fail to work in a variety of operating conditions such as outdoors in sunlight, an RGB-D imaging system that includes ultrasonic depth or distance sensing can prove desirable and provide a basis for a wide range of RGB-D imaging applications, such as spatial imaging, gesture identification, distance detection, three dimensional mapping, and the like. In contrast to conventional RGB-D systems, an ultrasonic array that uses beamforming can acquire three-dimensional maps including depth information without being subject to ambient light interference. Additionally ultrasonic sensors use substantially less power than RGB-D systems using infrared sensors, which can be desirable for mobile or moving platforms such as unmanned aerial vehicles (UAVs), and the like. These results can be achieved, according to one embodiment disclosed herein, by a RGB-D imaging system 100 as illustrated in FIG. 1.

Turning to FIG. 1, the RGB-D imaging system 100 is shown as comprising an ultrasonic sensor array 110 that is operably connected to an imaging device 120, and an RGB camera assembly 130 that is operably connected to the imaging device 120.

In various embodiments, the ultrasonic sensor array 110 can comprise a plurality of ultrasonic sensors 112 positioned on a substrate 113 in a matrix 114 defined by a plurality of rows R and columns C. One or more ultrasonic emitters 111 can be positioned on the substrate 113 within the matrix 114 between the rows R and columns C of ultrasonic sensors 112. In further embodiments, one or more ultrasonic emitters 111 can be positioned outside of the matrix 114 in any suitable position about the RGB-D imaging system 100. For example, one or more ultrasonic emitters 111 can be positioned in the same, parallel or a separate plane from the matrix 114.

In some embodiments, there can be a single ultrasonic emitter 111 or there can be any suitable plurality of ultrasonic emitters 111 arranged or positioned in any desirable or suitable configuration. There can also be any suitable plurality of ultrasonic sensors 112 arranged or positioned in any desirable or suitable configuration, which may or may not be a matrix 114 configuration. In various embodiments, the ultrasonic sensor array 110 can comprise a piezoelectric transducer, a capacitive transducer, magnetostrictive material, or the like. Accordingly, in various embodiments, any suitable array that provides for the transmission and/or sensing of sound waves of any suitable frequency can be employed without limitation.

The camera assembly 130 can comprise a lens 131 that is configured to focus light 132 onto a light sensing array or chip 133 of pixels 134 that converts received light 132 into a signal that defines an image as discussed herein. Although the lens 131 is depicted as a digital single-lens reflex (DSLR) lens, in various embodiments, any suitable type of lens can be used. For example, in some embodiments, the lens 131 can comprise any suitable lens system, including a pin-hole lens, a biological lens, a simple convex glass lens, or the like. Additionally, lenses in accordance with various embodiments can be configured with certain imaging properties including a macro lens, zoom lens, telephoto lens, fisheye lens, wide-angle lens, or the like.

While the camera system 130 can be used to detect light in the visible spectrum and generate images therefrom, in some embodiments, the camera system 130 can be adapted to detect light of other wavelengths including, X-rays, infrared light, micro waves, or the like. Additionally, the camera system 130 can comprise one or more filter. For example, the camera system 130 can comprise an infrared-cut filter that substantially filters out infrared wavelengths, which can be desirable for operation of the RGB-D system in environments where infrared interference is an issue. In another example, the camera system 130 can comprise an infrared-pass filter that substantially filters out all wavelengths except for infrared wavelengths, and the light sensing array or chip 133 can be configured to sense infrared wavelengths.

The camera system 130 can also be adapted for still images, video images, and three-dimensional images, or the like. Accordingly, the present disclosure should not be construed to be limiting to the example camera system 130 shown and described herein.

In various embodiments, the imaging device 120 can comprise a processor 121, a memory 122, and a display 123. The camera system 130 and ultrasonic sensor array 110 can be operatively connected to the imaging device 120 so that images or data generated by the camera system 130 and ultrasonic sensor array 110 can be processed by the processor 121 and/or stored in the memory 122. Processed images can be presented on the display 123.

In further embodiments, any of the processor 121, memory 122 and display 123 can be present in a plurality or can be absent. For example, in some embodiments, an RGB-D imaging system 100 does not include a display 123, and generated images discussed herein are sent to another computing device or display where such images can be presented.

Figure 4:
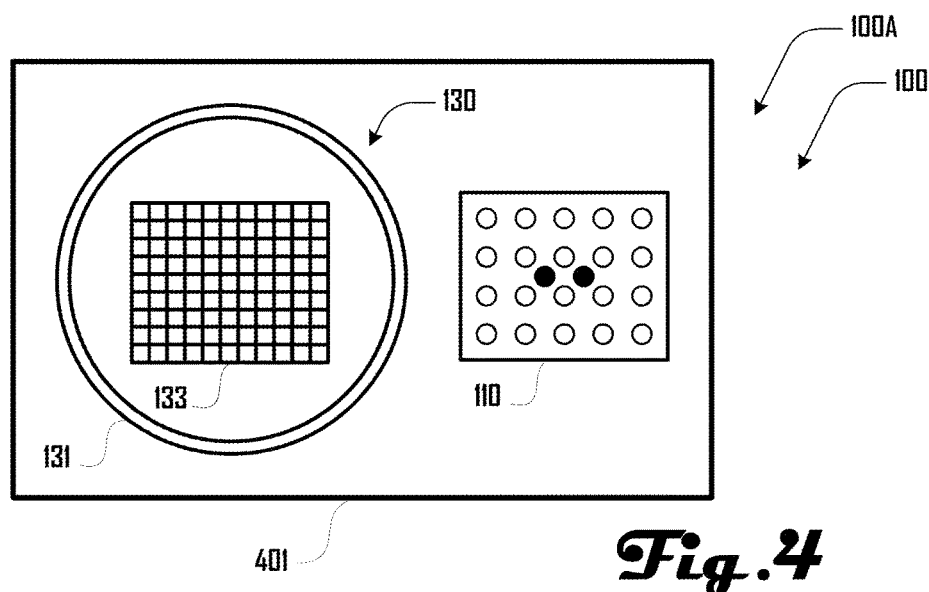
FIG. 4 is an exemplary front-view drawing illustrating an embodiment of an RGB-D imaging system that includes one RGB camera system and one ultrasonic depth sensor.
Figure 7:
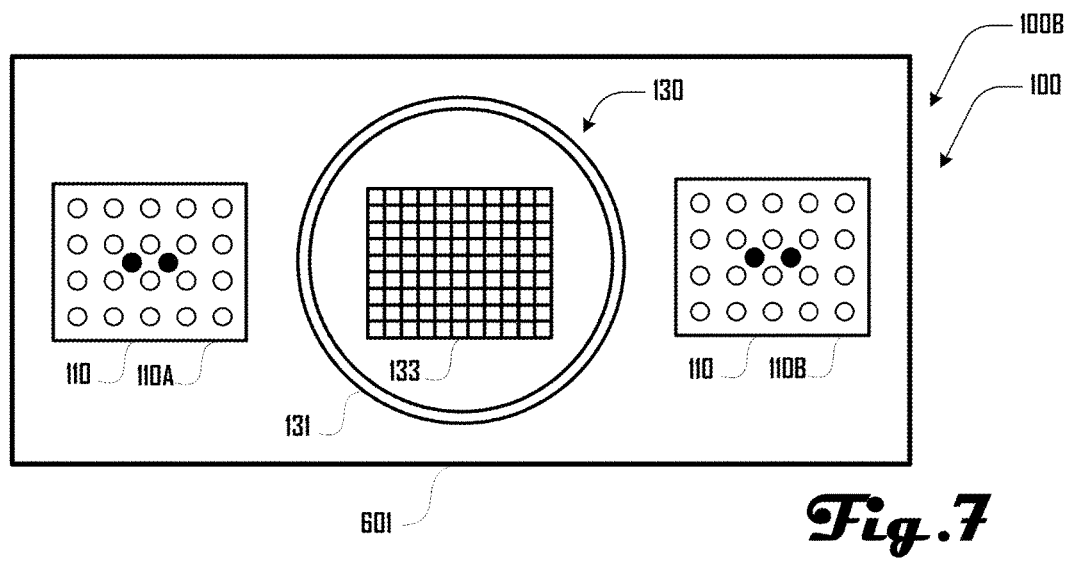
FIG. 7 is an exemplary front-view drawing illustrating an embodiment of an RGB-D imaging system that includes one RGB camera system and two ultrasonic depth sensors.

In some embodiments, any of the camera system 130, imaging device 120, and ultrasonic sensor array 110 can be present in any suitable plurality. For example, as discussed in more detail herein and as illustrated in FIG. 4, one embodiment 100A of an RGB-D imaging system 100 can comprise one camera system 130 and one ultrasonic sensor array 110. In another example, as discussed in more detail herein and as illustrated in FIG. 7, one embodiment 100B of an RGB-D imaging system 100 can comprise one camera system 130 and two ultrasonic sensor arrays 110.

Figure 10:
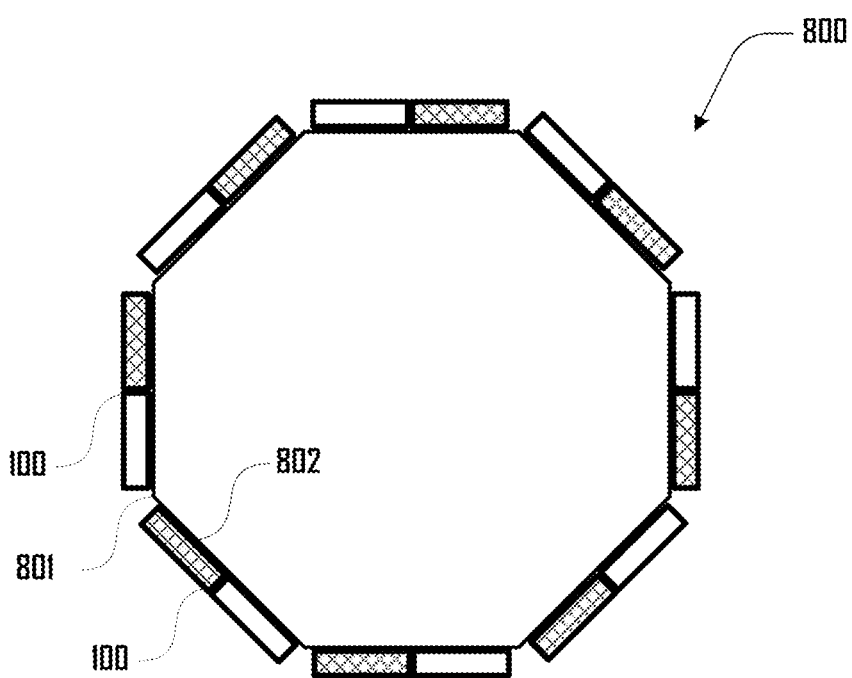
FIG. 10 illustrates an embodiment of an RGB-D imaging assembly that includes a plurality of RGB-D imaging systems.

In a further example, as discussed in more detail herein and as illustrated in FIG. 10, a three-dimensional imaging system 800 can comprise a plurality of RGB-D imaging systems 100 that each comprise one camera system 130 and one or more ultrasonic sensor arrays 110. In such an embodiment, each RGB-D imaging system 100 can be associated with an individual imaging device 120 (not shown in FIG. 10) or each RGB-D imaging system 100 can be associated with a central or common imaging device 120 (not shown in FIG. 10). In other words, associated sets of camera systems 130 and ultrasonic sensor arrays 110 can each be associated with imaging device 120 or can be operatively connected with a central or common imaging device 120.

As discussed in more detail herein, an RGB-D imaging system 100 can be configured to generate RGB-D images. For example, referring to FIGS. 1, 2 and 3, the camera system 130 can be configured to generate an RGB triplet image 210 comprising pixel arrays for red, green and blue values 211R, 211G, 211B. The ultrasonic sensor array 110 can be configured to generate a depth-map array 220. As discussed in detail herein, the RGB triplet image 210 and depth-map array 220 can be combined to generate an RGB-D quad image 230 that comprises the pixel arrays for red, green and blue values 211R, 211G, 211B and the depth-map array 220. Accordingly, each pixel location of the RGB-D quad image 230 is associated with a red value (R), a green value (G), and a blue value (B) in addition to a depth or distance value (D) corresponding to a distance from the ultrasonic sensor array 110 or RGB-D imaging system 100.

Figure 2:
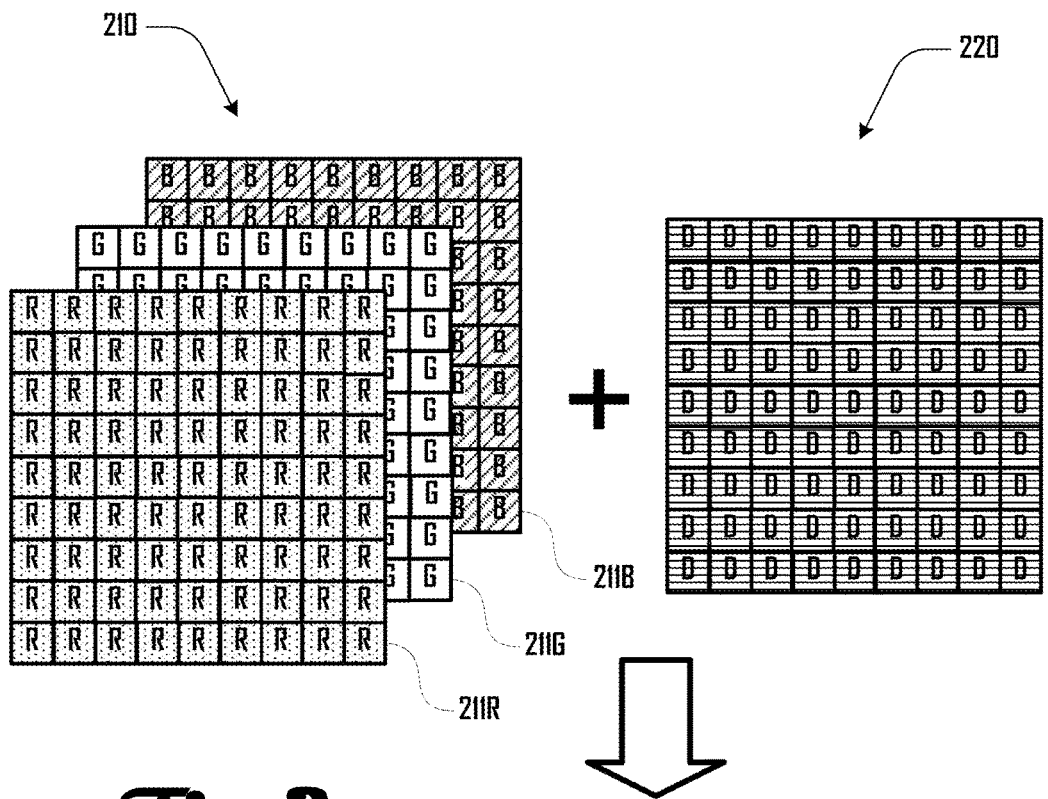
FIG. 2 is an exemplary drawing illustrating an embodiment of combining depth data with RGB data.
Figure 2:
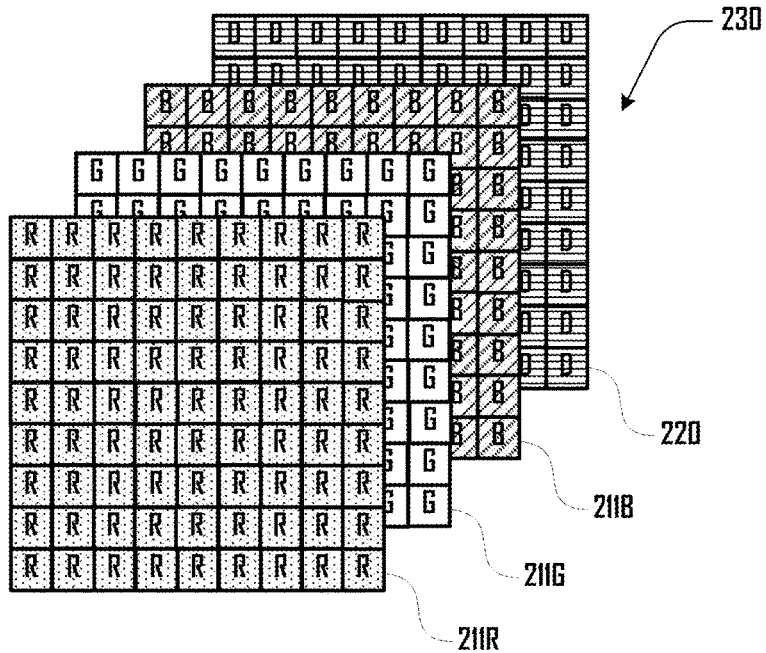

In some embodiments, as depicted in FIG. 2, the RGB triplet image 210 and depth-map array 220 can have the same resolution and size (i.e., the same number of pixels for a defined image size). In such an embodiment, the RGB triplet image 210 and depth-map array 220 can be added together.

Figure 3:
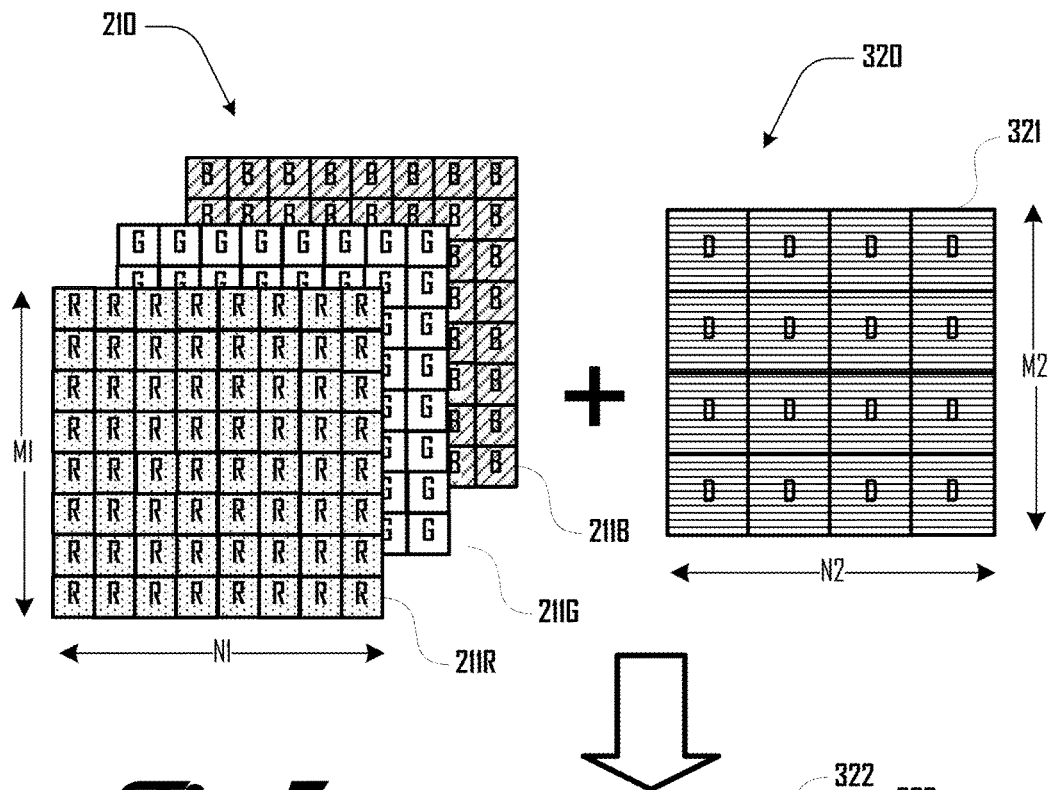
FIG. 3 is an exemplary drawing illustrating another embodiment of combining depth data with RGB data.
Figure 3:
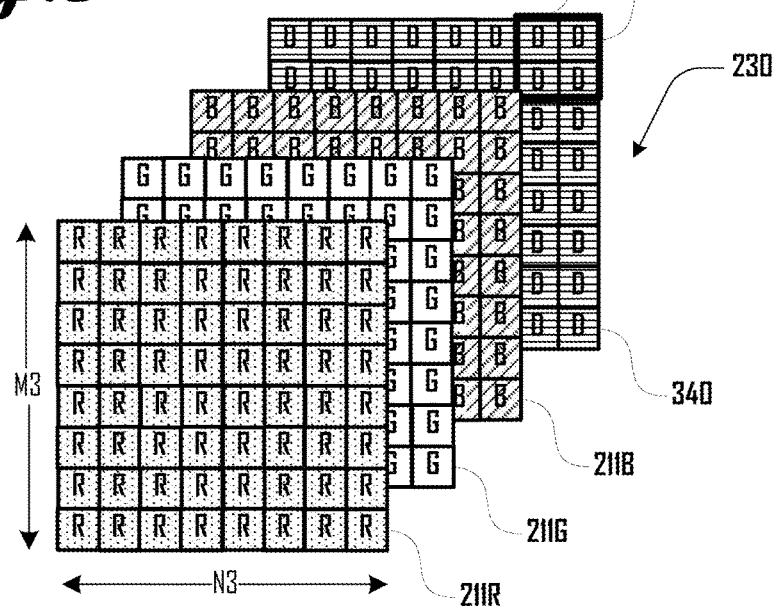

However, in some embodiments, as depicted in FIG. 3, the RGB triplet image 210 and depth-map array 320 can have different resolutions (i.e., a different number of pixels for a defined image size). For example, the pixel arrays for red, green and blue values 211R, 211G, 211B in FIG. 3 are 8×8 pixels in an image size of N1×M1 whereas the depth-map array 320 is 4×4 pixels in an image size of N2×M2. In an embodiment where N1=N2 and M1=M2, the RGB triplet image 210 and/or depth-map array 320 can be modified for combination to form the RGB-D quad image 230. In the example shown in FIG. 3, the depth-map array 320 can be upsampled to 8×8 pixels in an image size of N3×M3. The result is that the distance value of pixel 321 in the lower resolution depth-map array 320 is used in association with the pixels 322 in the highlighted set 323 of four pixels present in the upsampled depth-map array 340 present in the RGB-D quad image 230.

In this example, upsampling of the lower resolution 4×4 depth-map array 320 to the higher resolution 8×8 depth-map array 340 results in a clean upsampling given that pixel 321 can be cleanly split into four pixels 323. However, in further embodiments, conversion of a lower resolution depth map array 320 can require interpolation of certain pixels during upsampling (e.g., upsampling of a 4×4 image to an 11×11 image, or the like). In such an embodiment, any suitable interpolation method can be used, which can include nearest neighbor, bilinear, bicubic, bicubic smoother, bicubic sharper, and the like.

In some embodiments, interpolation of distance values can be based on the distance value. For example, interpolation can be treated differently for larger distances compared to smaller differences. In some embodiments, RGB triplet image 210 and/or depth-map array 220 can be resampled, and the method resampling of the RGB triplet image 210 and/or depth-map array 220 can be based on distance values.

Although some embodiments include an RGB triplet image 210 and depth-map array 320 where N1=N2 and M1=M2, in further embodiments, the RGB triplet image 210 and depth-map array 320 can be different sizes. For example, in some embodiments, the RGB triplet image 210 can be larger than the depth-map array 320. In other embodiments, the RGB triplet image 210 can be smaller than the depth-map array 320. Additionally, in various M3/N3 can be the same as M1/N1 and/or M2/N2, but may not be in some embodiments.

The RGB-D imaging system 100 can be embodied in various suitable ways, for example, as depicted in FIG. 4, one embodiment 100A includes ultrasonic sensor array 110 and camera system 130 positioned on a housing 401. The imaging device 120 (not shown in FIG. 4; see FIG. 1) can be positioned in and/or on the housing 401. For example, the processor 121 (see FIG. 1) and memory 122 (see FIG. 1) can be positioned within the housing 401 and the display 123 (see FIG. 1) can be positioned on a suitable portion of the housing 401.

Figure 5:
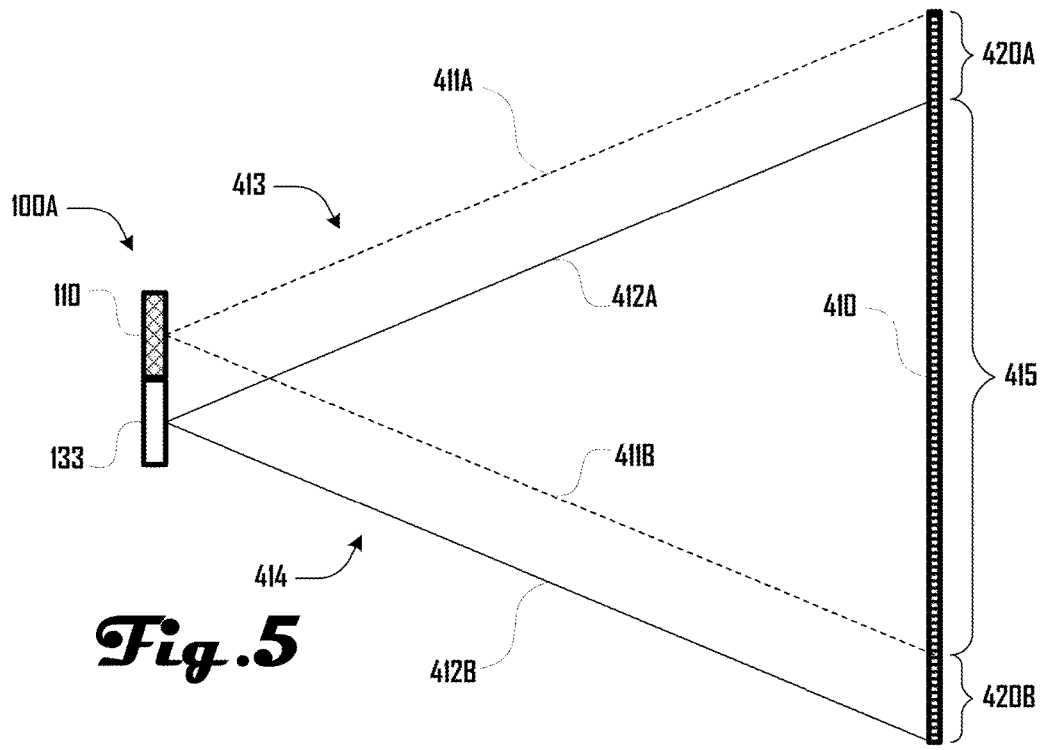
FIG. 5 is an exemplary top-view drawing illustrating the field of view of the RGB-D imaging system of FIG. 4.

As depicted in FIGS. 4 and 5, the ultrasonic sensor array 110 and photosensitive imaging chip 133 can be positioned side-by-side in a common or parallel plane on the housing 401. In a preferred embodiment, the ultrasonic sensor array 110 and photosensitive imaging chip 133 are separated by a distance no greater than 10 cm. As used herein, the terms 'common plane' and 'parallel plane' are not intended to be synonyms and these terms are intended to be distinct.

The ultrasonic sensor array 110 can have a field of view 413 defined by edges 411A, 411B and the RGB camera assembly 130 can have a field of view 414 defined by edges 412A, 412B. As illustrated in FIG. 5, the fields of view 413, 414 can be offset. In other words, images generated by the photosensitive imaging chip 133 and ultrasonic sensor array 110 may not be exactly the same because of the physical distance of the imaging chip 133 and ultrasonic sensor array 110 on the housing. In this example embodiment, the fields of view 413, 414 are shown relative to a surface 410, and comprise an overlapping portion 415, and offset portions 420A, 420B, where the fields of view are not overlapping. More specifically, the offset 420A is not present in the RGB camera assembly field of view 414 and the offset 420A is not present in the ultrasonic sensor array field of view 413.

Overlapping portion 415 can be identified and/or determined in various suitable ways. For example, in one embodiment, the size of overlapping portion 415 may be known or assumed and non-overlapping portions 420 can be automatically cropped based on such know or assumed values. In further embodiments, images can be aligned via any suitable machine vision or image processing method. For example, in on embodiment, a Features from Accelerates Segment Test algorithm (FAST algorithm) can be used for corner detection in the images to identify one or more special characteristic point; a Binary Robust Independent Elementary Features algorithm (BRIEF algorithm) can be used to identify feature descriptors of an image and Hamming distance between the identified descriptors of the two images can be used to identify an overlapping region of the first and second image.

Accordingly, respective images and distance maps generated by the imaging chip 133 and ultrasonic sensor array 110 can include portions that do not correspond to each other, which can be undesirable when these images and distance maps are combined to form an RGB-D image. In other words, for an RGB-D image to accurately indicate the distance value at a given pixel, images and distance maps may need to be aligned. In some embodiments, offset distance and offsets 420A, 420B can be considered to be negligible, and images and distance maps may not be aligned. In further embodiments, where offset distance is substantially constant, images and distance maps can be aligned based on a known or defined distance. For example, in an embodiment, where the sensor array 110 and photosensitive imaging chip 133 are positioned in parallel planes, the geometric distance between the sensor array 110 and photosensitive imaging chip 133 can be included in a known or defined distance used for alignment. Similarly, where the sensor array 110 and photosensitive imaging chip 133 are positioned in a common plane, the geometric distance between the sensor array 110 and photosensitive imaging chip 133 can be included in a known or defined distance used for alignment.

However, where offset distance varies (e.g., due to subject object's distance from the imaging system 100, environmental conditions, or the like), alignment can be performed based on distance values of a distance map. In some embodiments, where offset changes based on distance, it can be desirable to identify objects of interest in the field of view and optimize alignment of images and distance maps so that objects of interest are more accurately aligned. For example, there can be a determination that a foreground object at a distance of 1 meter is an object of interest and the background objects over 20 meters away are less important. Accordingly, alignment can be optimized for a 1 meter distance instead of a 20 meter distance so that distance data corresponding to the foreground object is more accurate and aligned compared to background distance data.

Determining object of interest can be done in any suitable way and can be based on various setting (e.g., close-up, mid-distance, far, people, landscape, or the like). Such objects of interest can be identified based on suitable machine vision and/or artificial intelligence methods, or the like. In further embodiments, alignment of images and distance maps can be done using feature detection, extraction and/or matching algorithms such as RANSAC (RANdom SAmple Consensus), Shi & Tomasi corner detection, SURF blob detection (Speeded Up Robust Features), MSER blob detection (Maximally Stable Extremal Regions), SURF descriptors (Speeded Up Robust Features), SIFT descriptors (Scale-Invariant Feature Transform), FREAK descriptors (Fast REtinA Keypoint), BRISK detectors (Binary Robust Invariant Scalable Keypoints), HOG descriptors (Histogram of Oriented Gradients), or the like.

In various embodiments it can be desirable to crop portions of images and/or distance maps that do not correspond to each other. For example, referring to FIG. 5 for an image captured of the object 410 portions 420A, 420B can be cropped from respective images and distance maps to leave overlapping portion 415.

Figure 6:
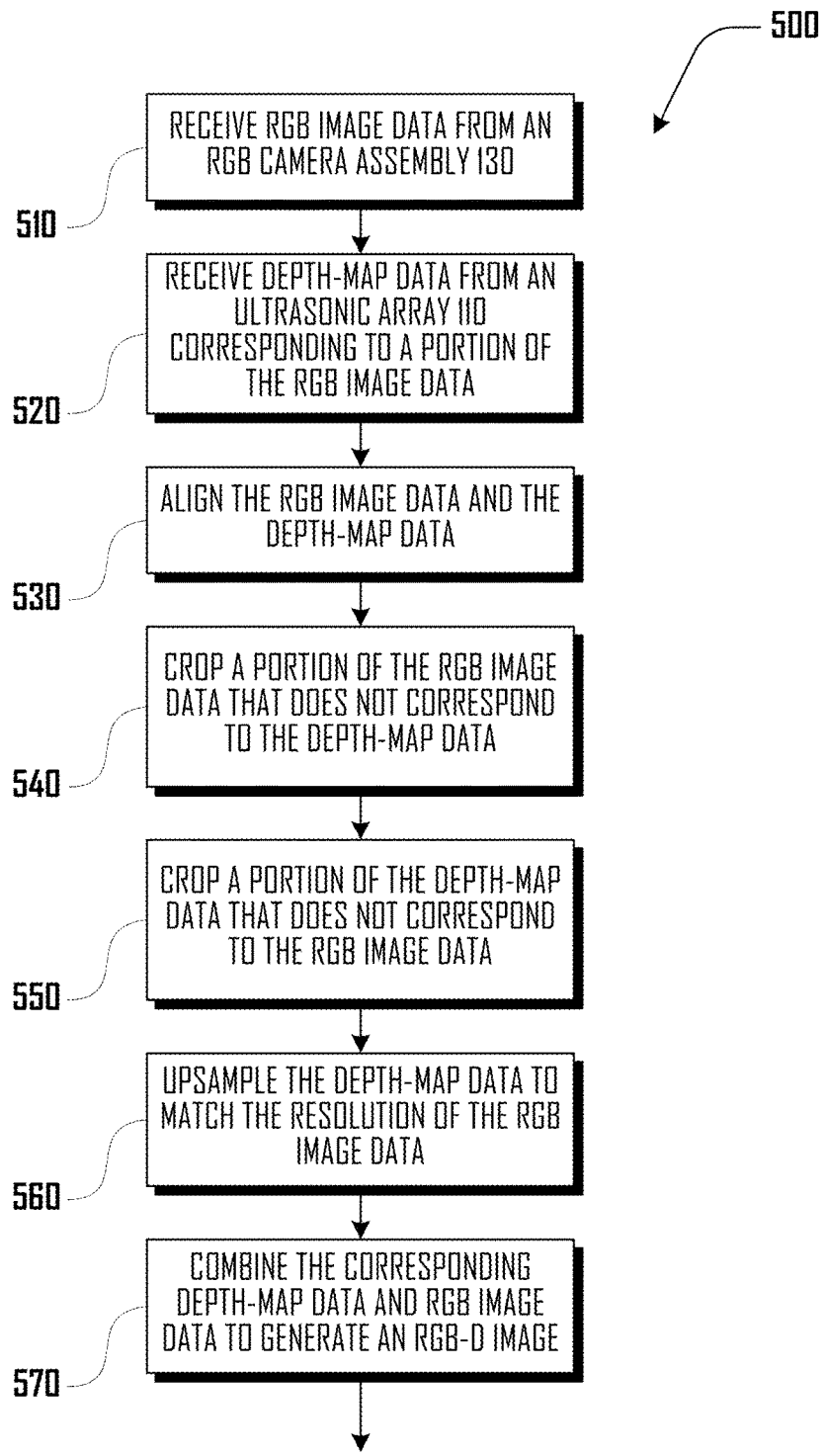
FIG. 6 illustrates a method of generating an RGB-D image in accordance with an embodiment.

FIG. 6 illustrates a method 500 of generating an RGB-D image in accordance with an embodiment. The method 500 begins, in block 510, where RGB image data is received from an RGB camera assembly 130 (see FIGS. 1 and 4), and in block 520 depth-map data is received from an ultrasonic array 110 (see FIGS. 1 and 4) corresponding to a portion of the RGB image data.

In block 530, the RGB image data and the depth-map data is aligned. In block 540, a portion of the RGB image data that does not correspond to the depth-map data is cropped, and in block 550, a portion of the depth-map data that does not correspond to the RGB data is cropped. In block 560, the depth-map data is upsampled to match the resolution of the RGB image data, and in block 570, the corresponding depth-map data and RGB image data are combined to generate an RGB-D image.

As depicted in FIG. 7, another embodiment 100B of an RGB-D imaging system 100 includes a first and second ultrasonic sensor array 110A, 110B and camera system 130 positioned on a housing 601. The imaging device 120 (not shown in FIG. 7; see FIG. 1) can be positioned in and/or on the housing 601. For example, the processor 121 (see FIG. 1) and memory 122 (see FIG. 1) can be positioned within the housing 601 and the display 123 (see FIG. 1) can be positioned on a suitable portion of the housing 601.

Figure 8:
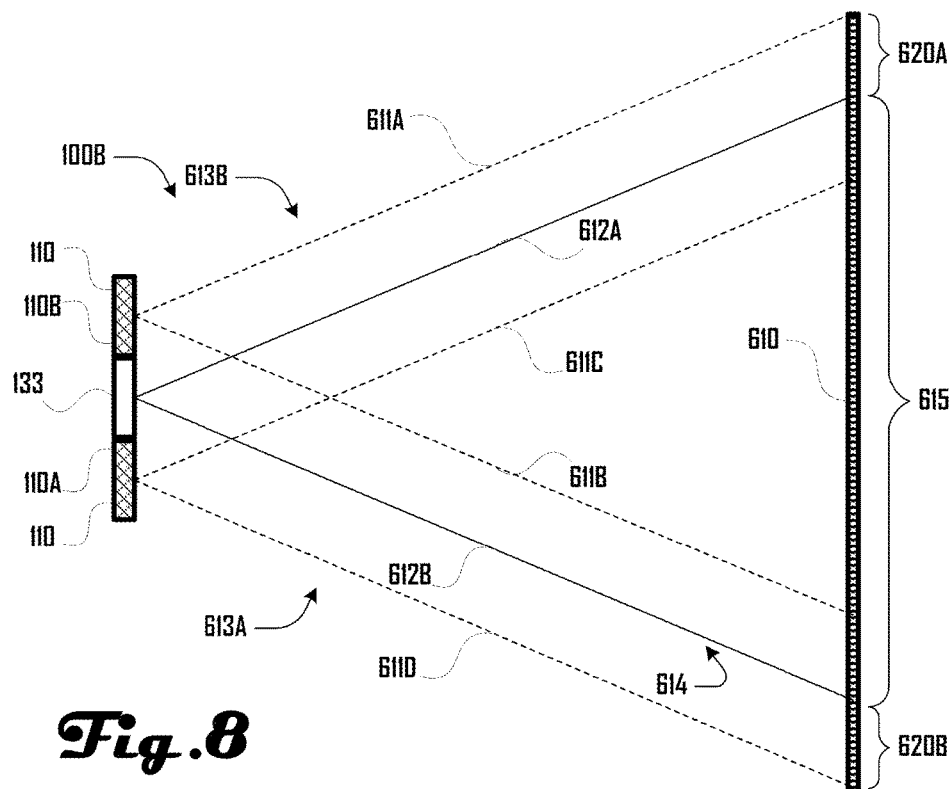
FIG. 8 is an exemplary top-view drawing illustrating the field of view of the RGB-D imaging system of FIG. 7.

As depicted in FIGS. 7 and 8, the ultrasonic sensor arrays 110 and photosensitive imaging chip 133 can be positioned side-by-side in a parallel or common plane on the housing 401 in a linear configuration with the photosensitive imaging chip 133 positioned between the first and second ultrasonic arrays 110A, 110B. In a preferred embodiment, the ultrasonic sensor arrays 110 and photosensitive imaging chip 133 are respectively separated by a distance no greater than 10 cm.

The ultrasonic sensor arrays 110A, 110B can have fields of view 613A, 613B defined by edges 611C, 611D and 611A, 611B respectively. The RGB camera assembly 130 can have a field of view 614 defined by edges 612A, 612B. As illustrated in FIG. 8, the fields of view 613A, 613B, 614 can be offset. In other words, images generated by the photosensitive imaging chip 133 and ultrasonic sensor arrays 110 may not be exactly the same because of the physical distance of the imaging chip 133 and ultrasonic sensor arrays 110 on the housing 601. In this example embodiment, the fields of view 613A, 613B, 614 are shown relative to a surface 610, and comprise an overlapping portion 615, and offset portions 620A, 620B, where the fields of view 613A, 613B, 614 are not overlapping. More specifically, neither the offset 620A or 620B is present in the RGB camera assembly field of view 614, whereas the overlapping portion 615 includes corresponding image data from the imaging chip field of view 614 and depth-map data from one or both of the array fields of view 613A, 613B.

Figure 9:
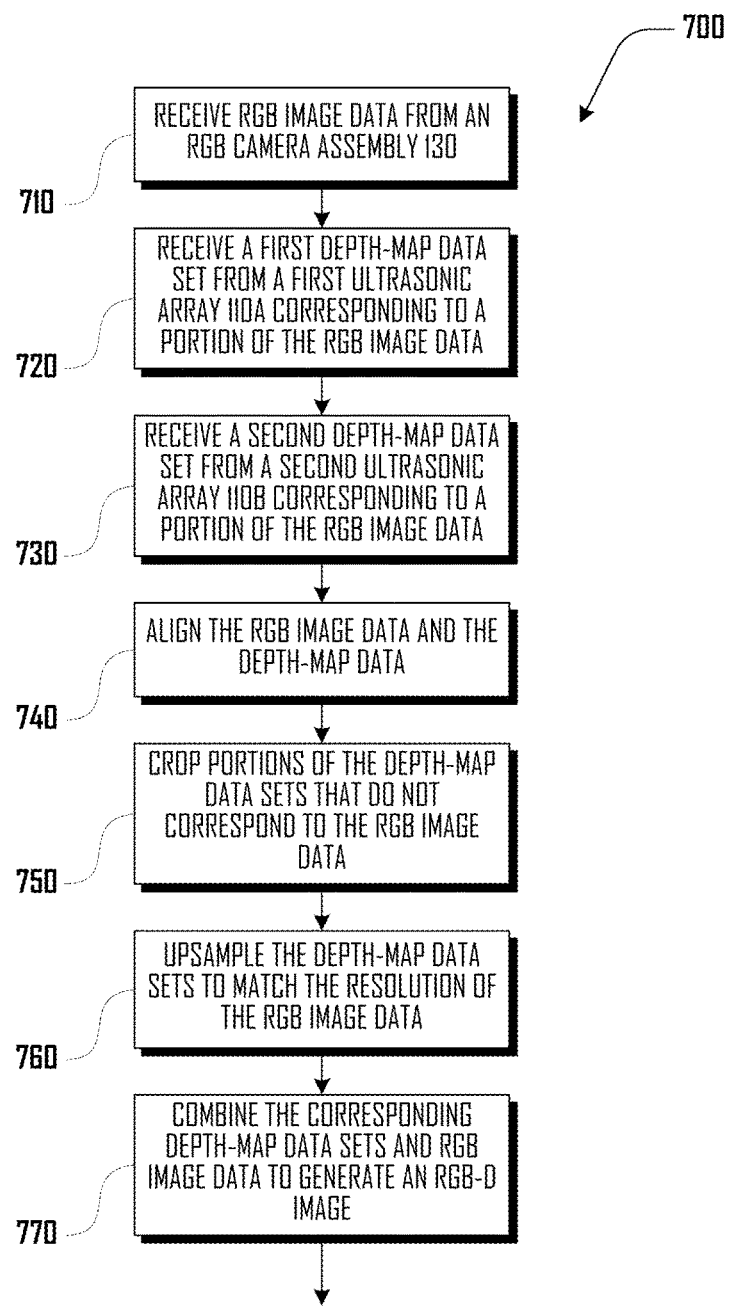
FIG. 9 illustrates a method of generating an RGB-D image in accordance with an embodiment.

FIG. 9 illustrates a method 700 of generating an RGB-D image in accordance with an embodiment. The method 700 begins, in block 710, where RGB image data is received from an RGB camera assembly 130 (see FIGS. 1 and 7). In block 720, a first depth-map data set is received from a first ultrasonic array 110A (see FIGS. 1 and 4) corresponding to a portion of the RGB image data, and in block 730, a second depth-map data set is received from a second ultrasonic array 110A (see FIGS. 1 and 7) corresponding to a portion of the RGB image data.

In block 740, the RGB image data and the depth-map data is aligned. In block 750, portions of the depth-map data sets that do not correspond to the RGB image data are cropped, and in block 760, the depth-map data sets are upsampled to match the resolution of the RGB image data. Accordingly, in various embodiments, one or both of the first and second depth-map data sets have a lower resolution than the resolution of the RGB image data. In block 770, the corresponding depth-map data sets and RGB image data is combined to generate an RGB-D image.

FIG. 10 illustrates an embodiment of an RGB-D imaging assembly 800 that includes a plurality of RGB-D imaging systems 100 that are respectively positioned on faces 802 of a housing 801. Although the example embodiment 800 illustrates an octagon housing 801 having eight faces 802 with imaging systems 100 positioned on each face, in further embodiment there can be any suitable plurality of imaging systems 100 positioned in various planes Having a plurality of imaging systems 100 positioned in different planes can be desirable because it can be possible to generate panoramic and/or three dimensional RGB-D images that are a composite of a plurality of RGB image data and a plurality of distance-map data. Additionally, although the example embodiment 800 depicts imaging systems 100 at a common height in a common or parallel plane, in further embodiments, a housing can comprise a regular or irregular polyhedron, or the like.

Figure 11:
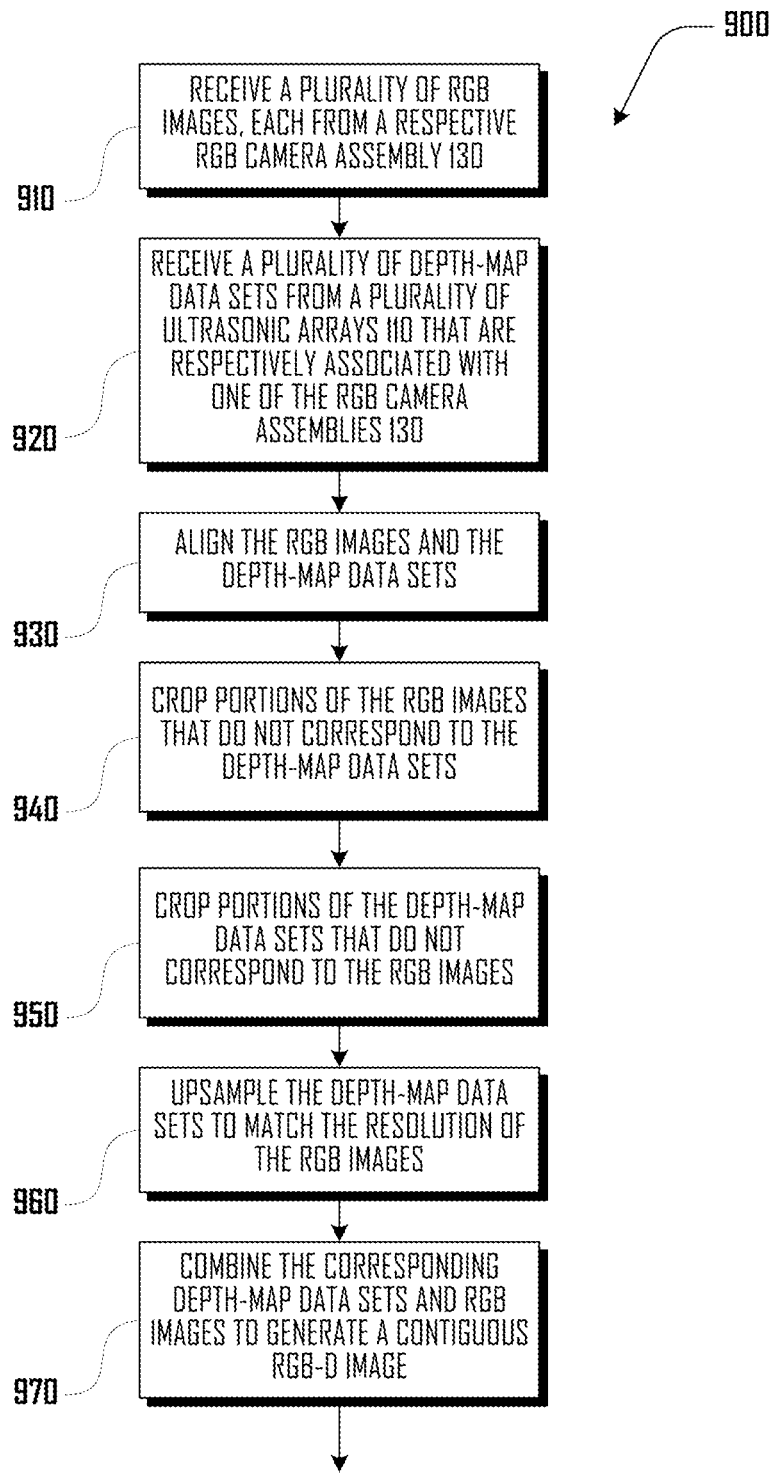
FIG. 11 illustrates a method of generating an RGB-D image in accordance with an embodiment.

FIG. 11 illustrates a method 900 of generating an RGB-D image in accordance with an embodiment. The method 900 begins, in block 910, where a plurality of RGB images are received, each from a respective RGB camera assembly 130 (See FIG. 1). In block 920, a plurality of depth-map sets are received from a plurality of ultrasonic arrays 110 (See FIG. 1) that are respectively associated with one of the RGB camera assemblies 130, and in block 930, the RGB images and the depth-map data sets are aligned. At 940, portions of the RGB images that do not correspond to the depth-map data sets are cropped, and at 950, portions of the depth-map data sets that do not correspond to the RGB images are cropped. At block 960, the depth-map data sets are upsampled to match the resolution of the RGB images, and at 970, the corresponding depth-map data sets and RGB images are combined to generate a continuous RGB-D image.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A Red, Green, Blue plus Distance (RGB-D) imaging system, comprising:
   a first ultrasonic sensor array comprising an ultrasonic emitter and a plurality of ultrasonic sensors;
   a Red, Green and Blue (RGB) camera assembly comprising a photosensitive imaging chip and a lens and being operably connected with said first ultrasonic sensor array; and a second ultrasonic sensor array operably connected to said first ultrasonic sensor array and said RGB camera assembly, wherein said photosensitive imaging chip is positioned between said first and second ultrasonic sensor arrays.

2. The RGB-D imaging system of claim 1, wherein said first ultrasonic sensor array and said photosensitive imaging chip are positioned in a parallel plane.

3. The RGB-D imaging system of claim 2, wherein said first ultrasonic sensor array and said photosensitive imaging chip are separated by a distance that is less than or equal to ten centimeters.

4. The RGB-D imaging system of claim 1,
wherein said ultrasonic sensors are positioned on a substrate in a matrix configuration having rows and columns, and
wherein said ultrasonic emitter is positioned within the matrix configuration and between the rows and columns.

5. The RGB-D imaging system of claim 1,
wherein said ultrasonic sensors are positioned on a substrate in a matrix configuration having rows and columns, and
wherein said ultrasonic emitter is positioned outside of the matrix configuration.

6. The RGB-D imaging system of claim 1, further comprising a processor for receiving depth-map data from said first ultrasonic sensor array and RGB image data from said RGB camera assembly and generating a contiguous RGB-D image from the received depth-map and RGB image data.

7. The RGB-D imaging system of claim 6, wherein the depth-map data corresponds to a portion of the RGB image data.

8. The RGB-D imaging system of claim 6, further comprising a display for presenting the contiguous RGB-D image.

9. The RGB-D imaging system of claim 1, wherein said first and second ultrasonic sensor arrays and said photosensitive imaging chip are positioned in a parallel plane.

10. The RGB-D imaging system of claim 1, wherein said first and second ultrasonic sensor array and said photosensitive imaging chip are positioned in a linear configuration.

11. The RGB-D imaging system of claim 1, further comprising a plurality of paired ultrasonic sensor arrays with each respective pair positioned in a different parallel plane.

12. The RGB-D imaging system of claim 1, wherein said RGB camera assembly comprises an infrared-cut filter.

13. The RGB-D imaging system of claim 1, wherein said RGB camera assembly comprises an infrared-pass filter, and wherein said photosensitive imaging chip is configured to detect infrared light.

14. The RGB-D imaging system of claim 1, wherein said first ultrasonic sensor array and said RGB camera assembly are positioned aboard an unmanned aerial vehicle.

15. A method of generating a Red, Green, Blue plus Distance (RGB-D) image, comprising:
receiving Red, Green and Blue (RGB) image data from an RGB camera assembly;
receiving depth-map data from an ultrasonic sensor array, the depth-map data corresponding to a portion of the RGB image data; and
combining the corresponding depth-map data and RGB image data to generate the RGB-D image,
wherein said combining comprises cropping a portion of the RGB image data that does not correspond to the depth-map data.

16. The method of claim 15, wherein said combining comprises aligning the RGB image data and the depth-map data.

17. The method of claim 15, wherein said combining comprises cropping the depth-map data.

18. The method of claim 17, wherein said cropping the depth-map comprises cropping a portion of the depth-map data that does not correspond to the RGB image data.

19. The method of claim 15, wherein said combining comprises processing the depth-map data received from the ultrasonic sensor array via beamforming.

20. The method of claim 15, wherein said combining comprises upsampling the depth-map data to a resolution that is equal to a resolution of the RGB image data.

21. A method of generating an Red, Green, Blue plus Distance (RGB-D) image, comprising:
receiving Red, Green and Blue (RGB) image data from an RGB camera assembly;
receiving a first depth-map data set from a first ultrasonic sensor array corresponding to a first portion of the RGB image data;
receiving a second depth-map data set from a second ultrasonic sensor array corresponding to a second portion of the RGB image data;
cropping a portion of the first depth-map that does not correspond to the RGB image data, a portion of the second depth-map that does not correspond to the RGB image data, or a combination thereof; and
combining the corresponding depth-map data sets and RGB image data to generate the RGB-D image.

22. The method of claim 21, further comprising aligning the RGB image data and the first and second depth-map data sets.

23. A method of generating a Red, Green, Blue plus Distance (RGB-D) image, comprising:
receiving Red, Green and Blue (RGB) image data from an RGB camera assembly;
receiving depth-map data from an ultrasonic sensor array, the depth-map data corresponding to a portion of the RGB image data; and
combining the corresponding depth-map data and RGB image data to generate the RGB-D image,
wherein said combining comprises cropping a portion of the depth-map data that does not correspond to the RGB image data.

24. The method of claim 23, wherein said combining comprises aligning the RGB image data and the depth-map data.

25. The method of claim 23, wherein said combining comprises cropping the RGB image data.

26. The method of claim 25, wherein said cropping the RGB image data comprises cropping a portion of the RGB image data that does not correspond to the depth-map data.

27. The method of claim 23, wherein said combining comprises processing the depth-map data received from the ultrasonic sensor array via beamforming.

28. The method of claim 3, wherein said combining comprises upsampling the depth-map data to a resolution that is equal to a resolution of the RGB image data.

* * * * *